(12) United States Patent
Plummer et al.

(10) Patent No.: US 8,669,472 B2
(45) Date of Patent: Mar. 11, 2014

(54) APPLYING COMPRESSION TO BUSBARS IN A BUSWAY ASSEMBLY

(75) Inventors: David O. Plummer, Murfreesboro, TN (US); Kimberly M. Hankins, Smyrna, TN (US); Wayne E. Wright, Lebanon, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 194 days.

(21) Appl. No.: 13/218,670

(22) Filed: Aug. 26, 2011

(65) Prior Publication Data

US 2013/0048335 A1    Feb. 28, 2013

(51) Int. Cl.
*H02G 5/00*    (2006.01)

(52) U.S. Cl.
USPC ..... 174/68.2; 174/70 B; 174/88 B; 174/71 B; 361/611; 361/637; 439/212

(58) Field of Classification Search
USPC ........ 174/68.2, 70 B, 88 B, 72 B, 71 B, 99 B, 174/149 B, 133 B, 137 B; 439/212, 213, 114; 361/675, 715, 306.1, 306.3, 600, 611, 361/637, 638, 639, 648, 601
See application file for complete search history.

(56) References Cited

U.S. PATENT DOCUMENTS

| | | |
|---|---|---|
| 489,567 A | 1/1893 | Meade |
| 2,356,006 A | 8/1944 | Samer |
| 3,088,994 A | 5/1963 | Cataldo |
| 3,472,946 A | 10/1969 | Vincent |
| 3,639,676 A * | 2/1972 | Dempsey et al. ........... 174/99 B |
| 3,733,575 A | 5/1973 | Gottschalk et al. |
| 3,820,057 A | 6/1974 | Joly |
| 4,112,249 A | 9/1978 | Carlson |

(Continued)

FOREIGN PATENT DOCUMENTS

| | | | |
|---|---|---|---|
| DE | 102006043176 | 3/2008 | ............... H01R 4/50 |
| FR | 1156443 | 5/1958 | |
| FR | 2173375 | 10/1973 | ............... H01R 7/00 |
| WO | 86/01944 A1 | 3/1986 | |

OTHER PUBLICATIONS

International Search Report corresponding to co-pending Internatioinal Patent Application Serial No. PCT/US2012/050575, European Patent Office, dated Nov. 12, 2012; (5 pages).

(Continued)

*Primary Examiner* — Angel R Estrada
(74) *Attorney, Agent, or Firm* — Locke Lord LLP

(57) ABSTRACT

Electrical busway assemblies and methods and devices for applying compressive forces to a busbar stack in an electrical busway assembly are disclosed herein. Electrical busway assemblies for distributing electricity are presented. The busway assembly includes a stack of electrically conductive busbars with one or more duct sides each disposed on a respective side of the busbar stack. Optionally, a duct top and duct bottom can be placed on the stack top and stack bottom, respectively. A surge clamp engages the stack top or stack bottom. A bolt attaches the surge clamp to each duct side. A compression nut threadably engages each bolt. Rotation of a bolt moves the corresponding compression nut, which acts to move the surge clamp along a path that is oblique with the path of the compression nut. The surge clamp, when moved by the compression nut(s), acts to apply a compressive force to the busbar stack.

20 Claims, 4 Drawing Sheets

(56) References Cited

U.S. PATENT DOCUMENTS

| | | | |
|---|---|---|---|
| 4,213,003 A | | 7/1980 | Carlson |
| 4,673,229 A | | 6/1987 | Jorgensen et al. |
| 4,678,253 A | | 7/1987 | Hicks, Jr. et al. |
| 4,705,334 A | | 11/1987 | Slicer et al. |
| 4,804,804 A | | 2/1989 | Hibbert et al. |
| 4,929,801 A | | 5/1990 | Hibbert |
| 5,122,072 A | | 6/1992 | Arn et al. |
| 5,203,135 A | | 4/1993 | Bastian |
| 5,206,461 A | | 4/1993 | Genzel et al. |
| 5,466,889 A * | 11/1995 | Faulkner et al. | 174/68.2 |
| 5,486,651 A * | 1/1996 | Morgan | 174/68.2 |
| 5,580,014 A | | 12/1996 | Rinderer |
| 5,619,014 A * | 4/1997 | Faulkner | 174/68.2 |
| 5,760,339 A * | 6/1998 | Faulkner et al. | 174/88 B |
| 5,828,000 A | | 10/1998 | Sano |
| 5,854,445 A | | 12/1998 | Graham et al. |
| 6,065,206 A | | 5/2000 | West |
| 6,359,225 B1 | | 3/2002 | West |
| 6,435,888 B1 | | 8/2002 | Reed, Jr. |
| 6,781,818 B2 | | 8/2004 | Josten et al. |
| 7,370,868 B2 | | 5/2008 | Genick, II |
| 2010/0319958 A1 | | 12/2010 | Latimer |

OTHER PUBLICATIONS

International Written Opinion corresponding to co-pending International Patent Application Serial No. PCT/US2012/050575, European Patent Office, dated Nov. 12, 2012; (5 pages).
Square D by Schneider Electric: Busway Systems "Catalog 5600CT9101R12/09, 2010 Class 5600" 1 page.
Square D by Schneider Electric: I-Line Busway, Available in two product lines: Plug-in and feeder; rated 600V maximum for either 30 3W or 30 4W configurations. http://www.schneider-electric.us/products-services/products/busway/iline-busway/ ; 1page dated Oct. 6, 2010.
International Search Report corresponding to co-pending International Patent Application Serial No. PCT/US2011/057266, European Patent Office, dated Mar. 7, 2012; (5 pages).
International Written Opinion corresponding to co-pending International Patent Application Serial No. PCT/US2011/057266, European Patent Office, dated Mar. 7, 2012; (5 pages).

* cited by examiner

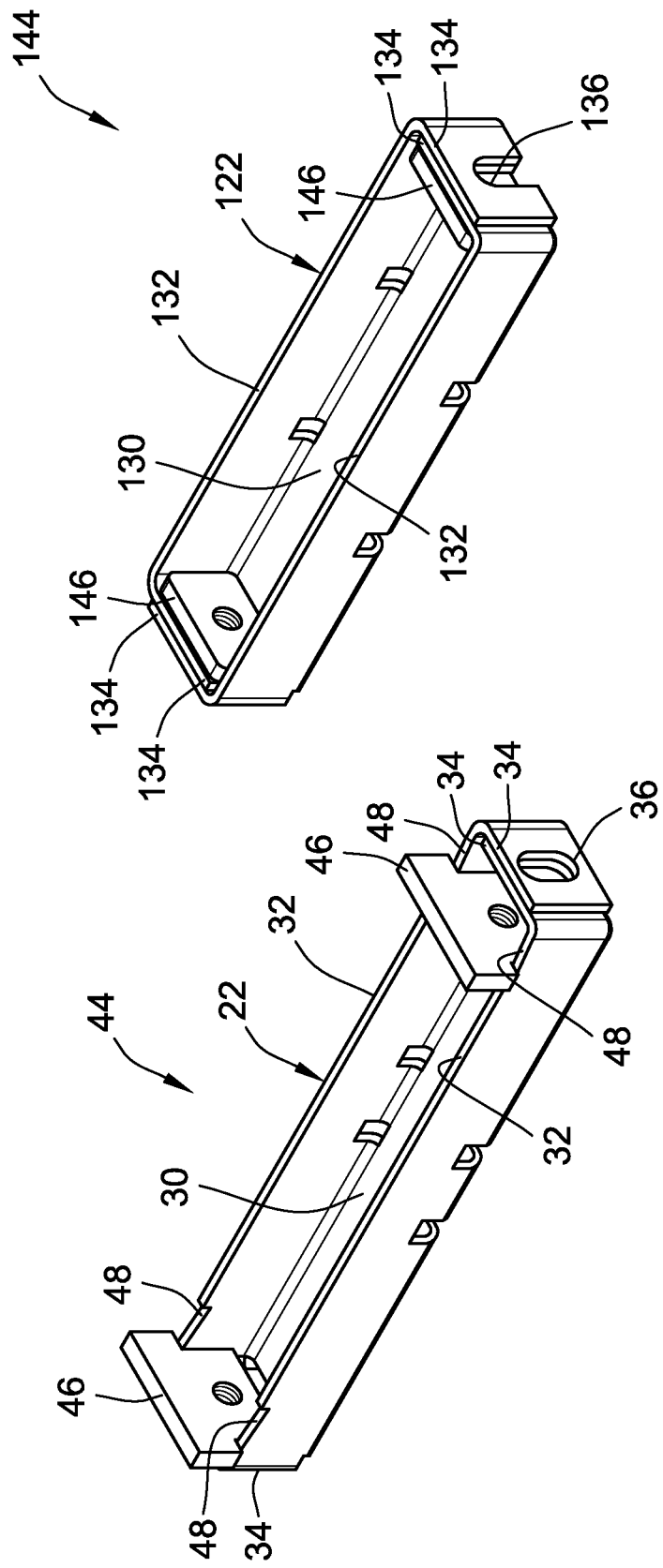

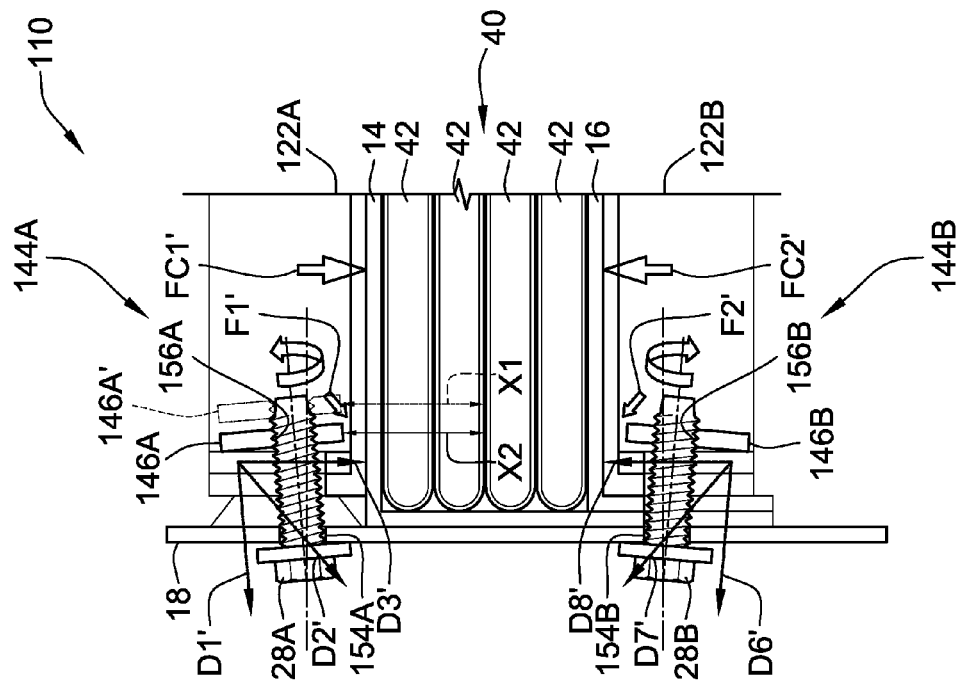
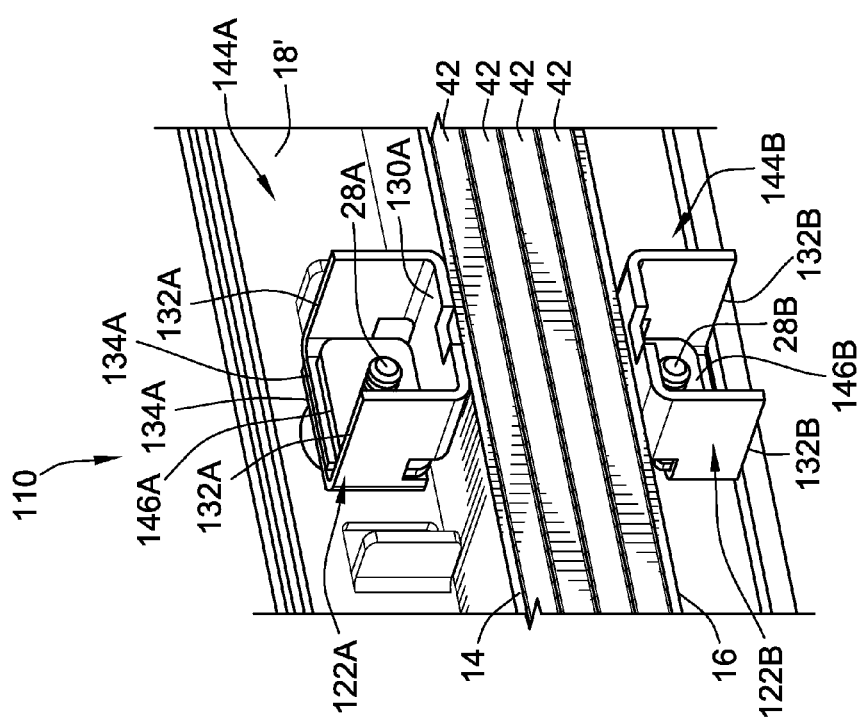

APPLYING COMPRESSION TO BUSBARS IN A BUSWAY ASSEMBLY

TECHNICAL FIELD

The present disclosure relates generally to electrical distribution systems, and more particularly to structural housing supports for busway electrical distribution systems.

BACKGROUND

Conventional busway power distribution systems supply electrical energy for commercial, residential, and industrial purposes. Busway systems are generally comprised of several factory-assembled sections, each of which includes a number of individually insulated, generally flat, elongated electrical conductors (more commonly known as "busbars"). The busbars are typically stacked one upon another and enclosed within a housing (or "protective duct"), which is intended to provide protection and support for the busbars. In many designs, the housing includes a duct top and a duct bottom, which cover the flat top- and bottom-surfaces of the busbars, respectively, and two or more duct sides of one or more panels each, which cover the lateral edges of the busbars. The duct tops and bottoms of the housing can be made of electrically conductive materials, such as aluminum or copper, for carrying the system ground current. The duct sides are generally made of a structurally robust material, such as steel, that is formed to provide strength to the housing. The housing is generally held together by rivets, screws, bolts, stitching, or other known methods.

During a short circuit event, magnetic repulsion forces can be generated between the individual busbars, urging the busbars away from each other, which can cause the busbars to deform which, in turn, causes the housing to bulge. In extreme cases, large short circuits can cause the housing to be pulled apart. To prevent or limit such damage, surge clamps are placed across the duct tops and bottoms at each end of the busway section and, often, at predetermined intervals along the longitudinal length of the busway section. The surge clamps are generally U-shaped in cross-section with flanges closing the ends. Existing surge clamps are bolted or otherwise rigidly fastened to the sides of the housing. The surge clamps are designed to mitigate the forces and vibrations caused by the short-circuit current by supporting the busbars at intervals to thereby maintain the busbars in proper relationship to each other and to the enclosures of the busbars.

Most surge clamps are rigidly fastened to the duct sides, for example, by screws or bolts that pass through the duct side and into the surge clamp end flanges. In many current designs, the surge clamps merely act to retain the busbars within the duct housing, and do not apply a compressive force to the busbar stack. Due to inherent manufacturing variations and build tolerances caused during assembly of the clamps and busway section, one or more of the surge clamps may not properly contact the top/bottom of the housing leaving gaps therebetween. These inadvertent gaps between the top/bottom of the housing and the surge clamp allow the conductor bars to separate in a short circuit event and, in some cases, permanently deform and damage the housing. The deformation of the busbars through the gaps also create an impact load when the busbars finally contact the surge clamps, increasing the stress that the surge clamps must endure. In addition, inadvertent gaps between the various components of the busway create internal air pockets, which impair thermal dissipation of heat generated by the system's electrical resistivity. There is therefore a need for clamping devices that more effectively maintain the busbars in proper relationship to each other and to the duct housing. There is also a need for clamping devices that eliminate unintentional gaps between the surge clamp and the housing.

SUMMARY

Busbar compression assemblies are disclosed herein that minimize or eliminate inadvertent gaps between the busbars, surge clamps, and the duct housing. In an exemplary configuration, the tolerances in the assembly can be diminished or removed by applying a variable compressive force to the busbar stack. With the electrically conductive busbars secured in this manner, the short-circuit integrity of the entire busway system is desirably increased. Another benefit that can be realized from the disclosed concepts is to create a more thermally efficient busway system. Each layer of air that exists between the individual busbars or between the busbars and the housing provides a layer of thermal resistance that is detrimental to heat being dissipated from the busbars to the surrounding environment. Utilizing some of the teachings disclosed herein, the busbar stack is compressed such that there are fewer and smaller intermittent layers of air and, thus, less thermal resistance in the system. By clamping the conductors together, the heat they produce can be more efficiently conducted out of the system. A more thermally efficient busway requires less conductor material, which translates to tremendous manufacturing and material cost savings.

According to aspects of the present disclosure, an electrical busway assembly for distributing electricity is presented. The electrical busway assembly includes a stack of busbars generally comprising a plurality of electrically conductive busbars stacked one on top of the other to define a stack top and a stack bottom. A duct side is disposed on one side of the stack of busbars, while a surge clamp engages the stack top or stack bottom. A bolt passes through the duct side and mates with the surge clamp to thereby attach the surge clamp to the duct side. A compression nut threadably engages the bolt. Rotation of the bolt effectuates movement of the compression nut in a first direction. The movement of the compression nut, in turn, applies a "nut" force on the surge clamp in a second direction. This force moves the surge clamp in a third direction whereby the surge clamp applies a compressive force to the stack of busbars.

In accordance with other aspects of the present disclosure, a busbar compression assembly is presented for an electrical busway assembly. The busway assembly includes a stack of electrically conductive busbars stacked to define a stack top and a stack bottom. A first duct side is disposed on a first side of the stack of busbars, and a second duct side is disposed on a second side of the stack of busbars opposite the first duct side. The compression assembly includes a surge clamp, one or more threaded fasteners, and one or more compression nuts. The surge clamp is configured to engage the stack top or stack bottom. Each threaded fastener is configured to mate with and connect the surge clamp and a respective one of the duct sides. Each compression nut is configured to threadably engage with a respective one of the threaded fasteners. Rotation of a threaded fastener moves a respective one of the compression nuts in a first direction. The moving compression nut applies a "nut" force to the surge clamp in a second direction which acts to move the surge clamp in a third direction. The surge clamp, when moved in the third direction, applies a compressive force to the stack of busbars.

Other aspects of the present disclosure are directed to an electrical busway assembly for distributing electricity from a power utility to a load. The busway assembly includes a stack of busbars with a stack top and stack bottom. The busbar stack includes elongated, individually insulated, electrically conductive busbars that are stacked one on top of the other. The stack top and stack bottom are both oriented generally perpendicular to the direction of stacking. First and second duct sides are each disposed on a respective side of the stack of busbars and oriented generally parallel to the stack. A duct top abuts the stack top, whereas a duct bottom abuts the stack bottom. A surge clamp abuts the duct top or duct bottom on a side opposite of the stack of busbars. A first bolt passes through the first duct side and through the surge clamp thereby attaching the surge clamp to the first duct side, and a second bolt passes through the second duct side and through the surge clamp thereby attaching the surge clamp to the second duct side. A first compression nut threadably engages the first bolt, and a second compression nut threadably engages the second bolt. Rotation of the first bolt draws the first compression nut in a first direction towards the first bolt, and rotation of the second bolt draws the second compression nut in a second direction towards the second bolt. The compression nuts, when drawn by their respective bolts, each applies an oblique force on the surge clamp thereby pressing against and cooperatively pushing the surge clamp in a third direction that is different from the first and second directions. The surge clamp, when moved in the third direction, applies a compressive force to the stack of busbars.

The above summary is not intended to represent each embodiment or every aspect of the present disclosure. Rather, the foregoing summary merely provides an exemplification of some of the novel features included herein. The above features and advantages, and other features and advantages of the present disclosure, will be readily apparent from the following detailed description of the embodiments and best modes for carrying out the present invention when taken in connection with the accompanying drawings and appended claims.

BRIEF DESCRIPTION OF THE DRAWINGS

FIG. 5 is a perspective-view illustration of an exemplary compression assembly with a nut and a surge clamp in accordance with aspects of the present disclosure.

FIG. 6 is a perspective-view illustration of another exemplary compression assembly with a nut and a surge clamp in accordance with aspects of the present disclosure.

FIG. 7 is an enlarged perspective-view illustration of an exemplary busway section shown partially cut away to more clearly depict another exemplary busbar compression assembly in accordance with aspects of the present disclosure.

FIG. 8 is an enlarged front-view illustration of the exemplary busway section of FIG. 7 taken in partial cross-section to more clearly depict the exemplary busbar compression assembly of FIG. 7.

Figure 1:
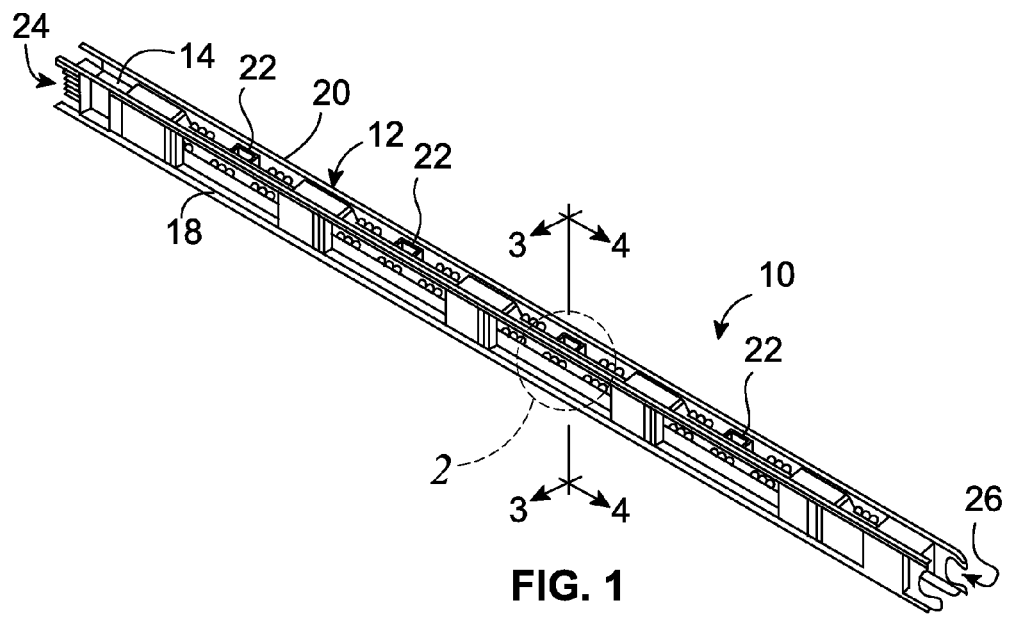
FIG. 1 is an elevated perspective-view illustration of a section of an exemplary busway power distribution system in accordance with aspects of the present disclosure.

While the present disclosure is susceptible to various modifications and alternative forms, specific embodiments have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of the invention as defined by the appended claims.

DETAILED DESCRIPTION

Figure 2:
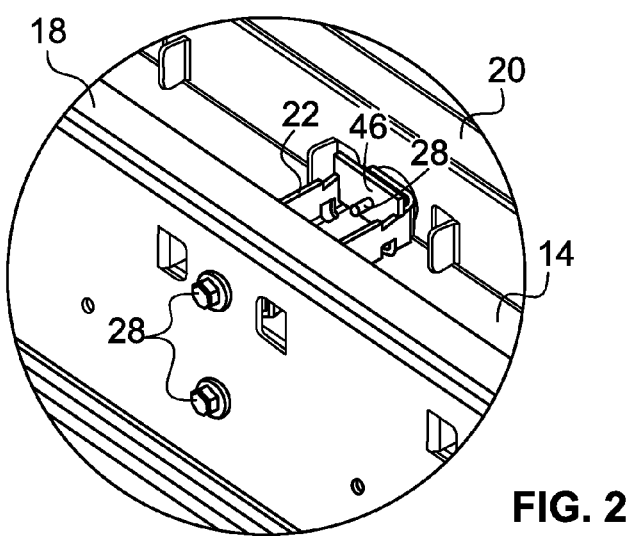
FIG. 2 is an enlarged perspective-view illustration of a portion of the exemplary busway section of FIG. 1.

Referring now to the drawings, wherein like reference numerals refer to like components throughout the several views, FIG. 1 illustrates a section of an example of a sectionalized busway electrical distribution system, designated generally as 10. These sections cooperate to form an electric power distribution network, for example, for transporting electricity received from a utility, such as an electrical power plant, to a load, which may include anything from a building and manufacturing plant to a home, machine or other circuit that consumes electricity. The busway section 10 (also referred to herein as "electrical busway assembly") includes a housing, generally indicated by reference numeral 12. The housing 12 includes an elongated duct top 14, an elongated duct bottom 16 (best seen in FIGS. 3 and 4), and two generally parallel, elongated duct sides 18 and 20, respectively, all of which extend along the longitudinal dimension of the busway section 10. In the embodiment of FIGS. 1 and 2, a number of generally U-shaped surge clamps 22 are placed laterally across the duct top 14 and duct bottom 16 at predetermined intervals along the longitudinal length of the busway section 10. At each end 24, 26 of the busway section 10, joint packs (not shown) can operate to mechanically connect and electrically couple adjacent busway sections.

Only selected components of the electrical busway assembly 10 have been shown and were described in detail hereinabove. Nevertheless, the electrical busway assemblies disclosed herein can include numerous additional components, such as panel boards, control modules, fuse assemblies, safety switches, end closures, bus plugs, and other well known peripheral components. Seeing as these components are well known in the art, they will not be described in further detail herein. The electrical busway assemblies can be based on, for example, the Square D® I-Line® and I-Line® II (feeder and plug-in) electrical busways, which are available from Schneider Electric™.

Figures 3, 4:
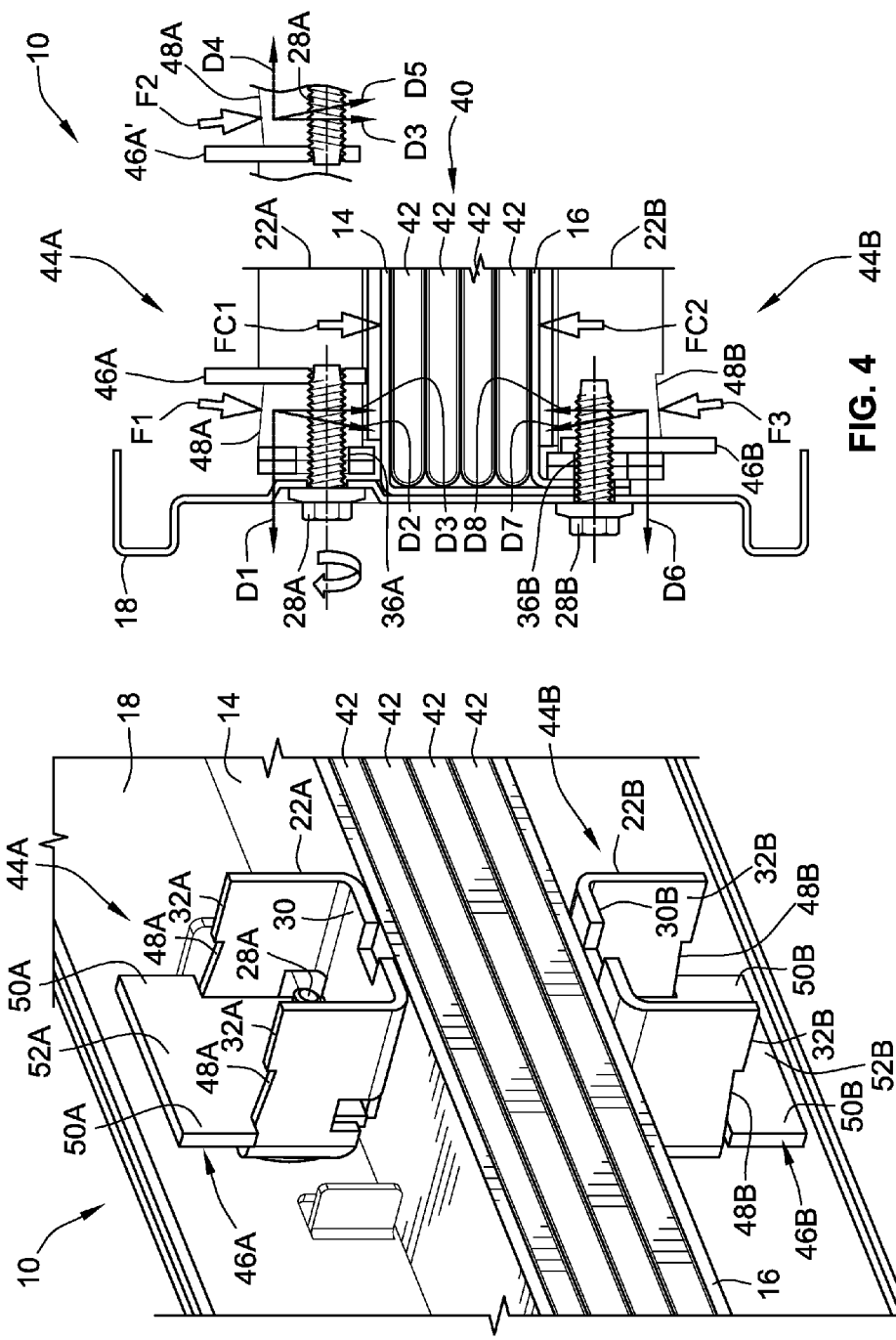
FIG. 3 is an enlarged perspective-view illustration of the exemplary busway section of FIG. 1 shown partially cut away along line 3-3 to more clearly depict an exemplary busbar compression assembly in accordance with aspects of the present disclosure.
FIG. 4 is an enlarged front-view illustration of the exemplary busway section of FIG. 1 taken in partial cross-section along line 4-4 to more clearly depict the exemplary busbar compression assembly of FIG. 3.

Referring now to FIGS. 2-4, and more particularly to FIG. 4, a first surge clamp 22A is placed laterally across and abuts the duct top 14, positioned intermediate and extending generally perpendicular to the duct sides 18, 20. A second surge clamp 22B is placed laterally across and abuts the duct bottom 16, positioned intermediate and extending generally perpendicular to the duct sides 18, 20. In the embodiment illustrated in FIGS. 3 and 4, the surge clamps 22A, 22B are generally structurally identical; as such, for brevity and conciseness, the surge clamps 22A, 22B will often be described collectively with reference to the surge clamp 22 of FIG. 5. Each surge clamp 22 is fabricated from a rigid and robust material, such as 12 Ga. or 14 Ga. aluminum or steel. The surge clamp 22 of FIG. 5 is an integrally formed, elongated, generally U-shaped structure having a generally flat bottom 30 with two generally parallel sidewalls 32. These sidewalls 32 extend generally perpendicularly from the flat bottom 30 along the longitudinal dimension (i.e., the length) of the surge clamp 22.

Flanges 34 at the longitudinal ends of each sidewall 32 are folded inwardly approximately 90 degrees to close off the longitudinal ends of the surge clamp 22. The two flanges 34 at each respective end of the surge clamp 22 are aligned to define an elongated slot 36, which extends generally perpendicularly with respect to the bottom 30 and is shaped and sized to receive therethrough a threaded fastener, such as bolts 28 (FIG. 2). By operatively mating a bolt 28 with a slot 36, the slots 36 provide a means of attaching the surge clamp 22 to the first and second duct sides 18, 20. The slots 36 also allow the surge clamp 22 to translate or slide in a generally linear fashion (e.g., upwardly and downwardly in FIG. 4) with respect to the duct sides 18, 20 and the bolts 28. In some embodiments, both surge clamps 22A, 22B have elongated slots, whereas in other embodiments only selected ones of the surge clamps—i.e., the first surge clamp 22A, has elongated slots 36A, whereas the second surge clamp 22B includes standard, circular slots. Although FIGS. 3 and 4 only show one end of each surge clamp 22A, 22B being securely attached to the first duct side 18 via bolts 28A and 28B, respectively, the other end of each surge clamp 22A, 22B can be secured to the second duct side 20 in an identical manner, as is apparent from the surge clamps 22 seen in FIG. 1. It should also be recognized that the two flanges 34 at each end of the surge clamp 22 could be replaced with a single flange, an end wall projecting upwardly from the base 30, or a separate piece that is rigidly attached to the surge clamp 22.

Enclosed within the housing 12 is a stack of busbars (or "busbar stack"), which is designated 40 in FIG. 4. In the illustrated embodiment, the busbar stack 40 is sandwiched between the first and second surge clamps 22A, 22B. This exemplary busbar stack 40 is composed of a plurality of elongated, generally flat, individually insulated, electrically conductive busbars 42. For example, each busbar 42 is fabricated from an electrically conductive material, such as copper and aluminum, and can be coated with an electrical insulator, such as epoxy or other non-conductive materials, and the stack 40 can be protected by a plastic insulation protection sheet. The busbars 42 are laid flat one upon another, oriented between and generally perpendicular with the first and second duct sides 18, 20. Recognizably, the busbar stack 40 can be comprised of greater or fewer than four busbars 42. Moreover the construction of the individual busbars 42 (e.g., constituent materials, means of fabrication, geometry, dimensions, etc.) can be individually or collectively modified, for example, to accommodate the intended application of the electrical distribution system.

With continuing reference to FIGS. 3 and 4, the duct top 14 covers the flat top and lateral sides of the busbar stack 40, separating the busbar stack 40 from the elongated duct sides 18, 20 and the surge clamps interspersed across the top of the housing 10 (e.g., first surge clamp 22A). In a similar respect, the duct bottom 16, which is interposed between the busbar stack 40 and the surge clamps interspersed across the bottom of the housing 10 (e.g., second surge clamp 22B), covers the flat bottom of the busbar stack 40. Both the duct top 14 and the duct bottom 16 have elongated, generally U-shaped bodies, but each have different dimensions. For instance, in the embodiment of FIG. 3, the width and depth of the duct top 14 are sufficient to fit the busbar stack 40 and most of the duct bottom 16 between the lateral sidewalls of the U-shaped duct top 14. The width and the depth of the duct bottom 16 of FIG. 3, which are narrower and shallower than that of the duct top 14, respectively, are sufficient to fit the surge clamp 22B between the lateral sidewalls of the U-shaped duct bottom 16.

FIG. 3 shows the exemplary busway power distribution section 10 partially cut away along line 3-3 of FIG. 1 to more clearly depict two exemplary busbar compression assemblies—i.e., a first compression assembly 44A and a second compression assembly 44B, in accordance with aspects of the present disclosure. The first and second compression assemblies 44A, 44B can both be structurally identical to the busbar compression assembly 44 of FIG. 5. In such an instance, a busbar compression assembly 44 includes a surge clamp 22, one or more threaded fasteners, such as bolts 28 (FIG. 2), and one or more compression nuts 46. Each of the compression nuts 46 threadably engages with the threaded shaft of one of the bolts 28 that is passing through the surge clamp 22 and a respective duct side 18, 20. Rotating the bolt 28A, for example in a clockwise direction in FIG. 4, will draw the compression nut 46A in a first direction D1 (leftward in FIG. 4) toward the first duct side 18 and the head of the bolt 28A. Once they translate far enough, the compression nuts 46 press against the inside surface of a respective surge clamp end flange 34, cooperating with the bolts 28 to securely attach each surge clamp 22 to the duct sides 18, 20. In the illustrated embodiment, the top and bottom of the busbar stack 40 are both provided with a respective compression assembly 44A and 44B such that the busbar stack 40 is sandwiched between two compression assemblies 44A, 44B. In an alternative arrangement, only the top or the bottom of the busbar stack 40 is provided with a compression assembly 44—e.g., only the first surge clamp 22A includes compression nuts 46A, whereas the second surge clamp 22B is attached to the duct sides 18, 20 in a stationary manner via standard square or hex nuts (not shown). In the illustrated embodiment, each of the compression nuts 46 slides between and is guided by the sidewalls 32 of the surge clamp 22 when the compression nut 46 moves back and forth between first and second positions.

The compression assemblies 44A, 44B are each configured to apply a compressive force to the stack of busbars 40. By way of non-limiting example, each compression nut 46A, 46B can be designed such that rotation of a corresponding bolt 28 acts to vary the force applied to the busbar stack 40 by that compression nut 46A, 46B. FIG. 4 illustrates one of the bolts 28A rotating in a clockwise direction. Rotation of this bolt 28A operates to move the upper-left compression nut 46A of FIG. 4 in a first direction D1 (e.g., horizontally leftward in FIG. 4) along a first path. By drawing the compression nut 46A in the first direction, the compression nut 46A applies a force F1, also referred to herein as "first nut force," on the surge clamp 22A. The directional component of the vector of force F1 is in a second direction D2 (downwardly in FIG. 4), which is oblique with the first direction D1. In this particular instance, the surge clamp 22A includes one or more ramped surfaces 48A which collectively define the direction of the vector of force F1. The compression nuts 46A, 46B of FIGS. 3 and 4 are integrally formed, T-shaped plates with a pair of protrusions 50A and 50B, respectively, projecting generally orthogonally from a central body portion 52A and 52B. Each of the protrusions 50A, 50B slides or presses against a respective one of the ramped surfaces 48A, 48B when the compression nut is moved in the first direction D1. In so doing, the protrusions 50A of the compression nut 46A generate a downwardly angled force (illustrated by arrow F1 in FIG. 4) on the surge clamp 22A via the ramped surfaces 48A. This force F1 operates to move the surge clamp 22A in a third direction D3 (e.g., vertically downward in FIG. 4). As seen in FIG. 4, the first and third directions D1, D3 are generally orthogonal to one another and oblique with respect to the second direction D2. The surge clamp 22A, when moved in the third direction D3 via the compression nut 22A, applies a first compressive force (illustrated by arrow FC1 in FIG. 4) to the stack of busbars 40.

In the upper right-hand corner of FIG. 4, the second compression nut 46A' in the compression assembly 44A, e.g., on the right-hand side of the surge clamp 22A (which can be considered a minor image of the first compression nut 46A) is shown moving in a fourth direction D4 (e.g., horizontally rightward in FIG. 4), which may be effectuated through rotation of a corresponding threaded fastener 28A with which the compression nut 46A' is threadably engaged. By drawing this compression nut 46A' in the fourth direction, the compression nut 46A' applies a second force F2, also referred to herein as "second nut force," to the surge clamp 22A. The directional component of the vector of force F2 is in a fifth direction D5 (downwardly in FIG. 4), which is oblique with the third and fourth directions D3, D4. The second nut force F2, singly or in conjunction with the first nut force F1, operates to move the surge clamp 22A in the third direction D3 (downwardly in FIG. 4) such that the surge clamp 22A applies a compressive force FC1 (FIG. 4) to the busbar stack 40.

As indicated above, the compression assembly 44B can be functionally and operationally similar to the compression assembly 44A. In particular, by drawing or otherwise moving the compression nut 46B towards the first duct side 18 (e.g., in a sixth direction D6 of FIG. 4, which can be similar to the first direction D1) via rotation of a corresponding bolt 28B, the compression nut 46B applies a force F3, also referred to herein as "third nut force," to the second surge clamp 22B. The directional component of the vector of force F3 is in a seventh direction D7 (upwardly in FIG. 4), which is oblique with the sixth direction D6. This force F3 operates to move the surge clamp 22B in an eighth direction D8 (e.g., vertically upward in FIG. 4). As seen in FIG. 4, the sixth and eighth directions D6, D8 are generally orthogonal to one another and oblique with respect to the seventh direction D7. The surge clamp 22B, when moved in the eighth direction D8 via the compression nut 22B, applies a second compressive force (illustrated by arrow FC2 in FIG. 4) to the stack of busbars 40.

The magnitude of the compressive force FC1 and FC2 generated by each of the compression assemblies 44A, 44B can be selectively varied, for example, by modifying the position of one or more of the compression nuts 46A, 46B. By way of example, and not limitation, moving the compression nut 46A from its originating point (e.g., a "first position" portrayed via the first compression nut 46A on the top of FIG. 4), closer to the end flanges 34 of the surge clamp 22A (e.g., a "second position" portrayed via the second compression nut 46B on the bottom of FIG. 4), will translate the protrusions 50A further up on the ramped surfaces 22A. As the compression nut 46A continues to translate, the force F1 generated by the compression nut 46A on the surge clamp 22A progressively increases and causes the surge clamp 22A to move further downward against the busbar stack 40. Logically, the further the surge clamp 22A moves, the more the busbar stack 40 is compressed.

Referring next to FIGS. 7 and 8, wherein like reference numerals refer to like components from FIGS. 1-5, another electrical busway assembly 110 is presented in accordance with other aspects of the present disclosure. Unless indicated otherwise, the busway assembly 110 can be similarly configured and, thus, can include any of the options and alternatives described above with respect to the busway assembly 10 of FIGS. 1 and 2. A first surge clamp 122A is placed laterally across and abuts the duct top 14, positioned intermediate and extending generally perpendicular to the duct sides 18, 20. A second surge clamp 122B is placed laterally across and abuts the duct bottom 16, positioned intermediate and extending generally perpendicular to the duct sides 18, 20. The surge clamps 122A, 122B portrayed in FIGS. 7 and 8 can be generally structurally identical and will therefore be described collectively with reference to the surge clamp 122 of FIG. 6. The surge clamp 122 is formed from a rigid and robust material, such as 12 Ga. or 14 Ga. aluminum or steel. The surge clamp 122 is an integrally formed, elongated, generally U-shaped structure having a generally flat bottom 130 with two opposing, generally parallel sidewalls 132 that extend generally perpendicularly from the flat bottom 130 along the longitudinal dimension (i.e., the length) of the surge clamp 122.

Flanges 134 at the longitudinal ends of each sidewall 132 are folded inwardly approximately 90° to close off the longitudinal ends of the surge clamp 122. The two flanges 134 at each respective end of the surge clamp 22 are aligned to define an elongated slot 136, which extends generally perpendicularly from the bottom 130 and is shaped and sized to receive therethrough a threaded fastener, such as bolts 28A and 28B (FIGS. 3 and 4). These slots 136 provide a means for attaching the surge clamp 122 to the first and second duct sides 18, 20, i.e., by operatively mating one of the bolts 28A, 28B with each slot 136. The slots 136 also allow the surge clamp 122 to translate or slide in a generally linear fashion (e.g., upwardly and downwardly in FIG. 8) with respect to the duct sides 18, 20 and the bolts 28A, 28B. Similar to the embodiments of FIGS. 3-5, both surge clamps 122A, 122B have elongated slots 136. Optionally, only selected ones of the surge clamps have elongated slots, whereas the other surge clamps include standard, circular slots. In addition, even though only one end of each surge clamp 122A, 122B is shown securely attached to the first duct side 18 via bolts 28A and 28B, respectively, the other end of each surge clamp 122A, 122B can be secured to the second duct side 20 in an identical manner.

Two exemplary busbar compression assemblies—i.e., a first compression assembly 144A and a second compression assembly 144B, are illustrated in FIGS. 7 and 8 in accordance with aspects of this disclosure. These compression assemblies 144A, 144B can both be structurally identical to the busbar compression assembly 144 of FIG. 6. In such an instance, each compression assembly 144 includes a surge clamp 122, one or more threaded fasteners, such as bolts 28A, 28B (FIG. 8), and one or more compression nuts 146. Each compression nut 146 threadably engages with the threaded shaft of one of the bolts that is passing through the surge clamp 122 and a respective duct side 18, 20. Rotating the bolt 28A, for example in a clockwise direction in FIG. 8, will draw the compression nut 146A in a first direction D1 (leftward in FIG. 4) toward the head of the bolt 28A and the first duct side 18. Similar to the compression nuts 46 of FIG. 5, the compression nuts 146 of FIG. 6 cooperate with the bolts 28 to securely attach each surge clamp 122 to the duct sides 18, 20. In the illustrated embodiment, each of the compression nuts 146 slides between and is guided by the sidewalls 132 of the surge clamp 122 when the compression nut 146 moves back and forth between first and second positions. Unless indicated otherwise below, the first and second compression assemblies 144A, 144B can be similarly configured and, thus, can include any of the options and alternatives described above with respect to the compression assemblies 44A, 144B of FIGS. 3 and 4.

The compression assemblies 144A, 144B are each configured to apply a compressive force to the stack of busbars 40. By way of non-limiting example, each compression nut 146A, 146B can be designed such that rotation of a corresponding bolt 28 acts to vary the force applied to the busbar stack 40 by that compression nut 146A, 146B. FIG. 8 illustrates the bolt 28A rotating in a clockwise direction, which operates to draw or otherwise move the compression nut 146A in a "first" direction D1' (e.g., leftward at a downward inclination in FIG. 8). Likewise, the bolt 28B is also shown rotating in a clockwise direction, which operates to draw or otherwise move the compression nut 146B in a "sixth" direction D6' (e.g., leftward at an upward inclination in FIG. 8). In this embodiment, the first duct side 18 includes two elongated slots 154A and 154B; each slot 154A, 154B receives therethrough at an oblique angle a respective bolt 28A, 28B that is threadably engaging with one of the compression nuts 146A, 146B. Moving the compression nuts 146A, 146B in their respective directions D1', D6' via rotation of a corresponding bolt 28A, 28B, as developed above, draws each nut 146A, 146B closer to the slot 154A, 154B, respectively, which operates to increase concentric alignment between the threaded hole 156A and 156B in the center of each compression nut 146A, 146B and the corresponding elongated slot 154A, 154B. As the compression nut 146A is drawn in the first direction D1' towards the slot 154A, the compression nut 146A moves from a first position (shown with hidden lines at 146A') to a second position (shown with solid lines), the first position being a first distance X1 from the center of the busbar stack 40, the second position being a second distance X2 from the center of the busbar stack 40, the first distance X1 being greater than the second distance X2. Drawing the compression nut 146B in the sixth direction D6' towards the slot 156B in a like manner will similarly reduce the distance between the compression nut 146B and the center of the busbar stack 40.

By moving the compression nuts 146A, 146B in this manner, the compression nut 146A applies a force F1' on the surge clamp 122A, whereas the compression nut 146B applies a force F2' on the surge clamp 122B. The directional component of the vector of force F1' is in a second direction D2' (downwardly in FIG. 8), while the directional component of the vector of force F2' is in a seventh direction D7' (upwardly in FIG. 8). The first force F1' operates to move the surge clamp 122A in a third direction D3' (e.g., vertically downward in FIG. 8), and the second force F2' operates to move the surge clamp 122B in an eighth direction D8' (e.g., vertically upward in FIG. 8). The first, second and third directions D1', D2', D3' are all generally oblique with one another, as seen in FIG. 8. Likewise, the sixth, seventh and eighth directions D6', D7', D8' are all generally oblique with one another. Each surge clamp 122A, 122B, when moved in this manner via their respective compression nuts 122A, 122B, applies a compressive force (illustrated by arrows FC1' and FC2' in FIG. 8) to the stack of busbars 40.

The busbar compression assemblies disclosed herein can provide improved short circuit protection, for example, by applying a desired clamping force to eliminate inadvertent gaps between the busway housing, the surge clamps, and the busbars, which in turn will also help compensate for manufacturing variations and build tolerances. This clamping force can increase busway short circuit strength by limiting or eliminating separation of the busbars during a short circuit event, which will reduce or possibly eliminate damage to the housing and busbars. Additionally, this solution would allow the busway to reach higher short circuit performance ratings. An additional benefit of these concepts is improved thermal performance of the busway system. By helping to compress all of the components in the busway together, air pockets that impede the flow of heat from the busway are minimized or eliminated. With a more thermally efficient busway, the size of the busbars can be decreased, which allows for significant cost savings.

While exemplary embodiments and applications of the present disclosure have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims. To that extent, elements and limitations that are disclosed, for example, in the Abstract, Summary, and Detailed Description sections, but not explicitly set forth in the claims, should not be incorporated into the claims, singly or collectively, by implication, inference or otherwise.

What is claimed is:

1. An electrical busway assembly for distributing electricity, the electrical busway assembly comprising:
    a stack of busbars including a plurality of electrically conductive busbars stacked one on top of the other to define a stack top and a stack bottom;
    a duct side disposed on a side of the stack of busbars;
    a surge clamp engaging the stack top or the stack bottom;
    a bolt passing through the duct side and mating with the surge clamp thereby attaching the surge clamp to the duct side; and
    a compression nut threadably engaging the bolt;
    wherein rotation of the bolt effectuates movement of the compression nut in a first direction, the movement of the compression nut applying a first nut force on the surge clamp in a second direction, the first nut force moving the surge clamp in a third direction whereby the surge clamp applies a first compressive force to the stack of busbars.

2. The electrical busway assembly of claim 1, wherein the surge clamp includes a ramped surface against which the compression nut presses when moving in the first direction.

3. The electrical busway assembly of claim 2, wherein the compression nut includes a body with a protrusion projecting therefrom, the protrusion sliding against the ramped surface when the compression nut is moved in the first direction.

4. The electrical busway assembly of claim 1, wherein the surge clamp includes an elongated base with two sidewalls projecting generally orthogonally therefrom, each of the sidewalls including a ramped surface, and wherein the compression nut includes a body with two protrusions projecting generally orthogonally therefrom, each of the protrusions sliding against a respective one of the ramped surfaces when the compression nut is moved in the first direction.

5. The electrical busway assembly of claim 1, wherein a magnitude of the compressive force applied by the surge clamp to the stack of busbars can be selectively varied as the compression nut moves in the first direction from a first position to a second position.

6. The electrical busway assembly of claim 1, wherein the duct side includes an elongated slot through which the bolt passes at an oblique angle when threadably engaging with the compression nut.

7. The electrical busway assembly of claim 6, wherein the bolt is received in a threaded hole defined in the compression nut, and wherein moving the compression nut in the first direction via rotation of the bolt increases coaxial alignment between the threaded hole and the elongated slot.

8. The electrical busway assembly of claim 1, wherein rotation of the bolt moves the compression nut in the first direction from a first position to a second position, the first position being a greater distance from a center of the stack of busbars than the second position.

9. The electrical busway assembly of claim 1, wherein the surge clamp includes an elongated base with two sidewalls projecting generally orthogonally therefrom, and wherein the compression nut slides between and is guided by the sidewalls of the surge clamp when the compression nut moves.

10. The electrical busway assembly of claim 1, further comprising:
a second duct side disposed on a second side of the stack of busbars;
a second bolt passing through the second duct side and mating with the surge clamp thereby attaching the surge clamp to the second duct side; and
a second compression nut threadably engaging the second bolt;
wherein rotation of the second bolt moves the second compression nut in a fourth direction, the movement of the second compression nut applying a second nut force on the surge clamp whereby the surge clamp is moved in the third direction.

11. The electrical busway assembly of claim 10, further comprising:
a second surge clamp engaging the other of the stack top or the stack bottom such that the stack of busbars is sandwiched between the first and second surge clamps;
a third bolt passing through the duct side and mating with the second surge clamp thereby attaching the second surge clamp to the duct side.

12. The electrical busway assembly of claim 11, further comprising:
a third compression nut threadably engaging the third bolt;
wherein rotation of the third bolt effectuates movement of the third compression nut in a sixth direction, the movement of the third compression nut applying a third nut force on the second surge clamp in a seventh direction, the third nut force moving the second surge clamp in an eighth direction whereby the second surge clamp applies a second compressive force to the stack of busbars.

13. The electrical busway assembly of claim 1, further comprising a second surge clamp engaging the other of the stack top or the stack bottom such that the stack of busbars is sandwiched between the surge clamps, wherein the second surge clamp is movable to apply a second compressive force to the stack of busbars.

14. A busbar compression assembly for an electrical busway assembly with first and second duct sides and a stack of busbars including a plurality of electrically conductive busbars stacked to define a stack top and a stack bottom, the first and second duct sides each being disposed on a respective side of the stack of busbars, the compression assembly comprising:
a surge clamp configured to engage the stack top or the stack bottom;
a threaded fastener configured to mate with and connect one of the duct sides and the surge clamp; and
a compression nut configured to threadably engage with the threaded fastener;
wherein rotation of the threaded fastener moves the compression nut in a first direction whereby the compression nut applies a first nut force to the surge clamp in a second direction, the first nut force moving the surge clamp in a third direction, the surge clamp, when moved in the third direction, applying a compressive force to the stack of busbars.

15. The compression assembly of claim 14, wherein the surge clamp includes a ramped surface, and wherein the compression nut includes a body with a protrusion projecting therefrom, the protrusion sliding against the ramped surface when the compression nut is moved in the first direction.

16. The compression assembly of claim 14, wherein the duct side includes an elongated slot passing therethrough at an oblique angle to the threaded fastener.

17. The compression assembly of claim 14, wherein the threaded fastener is received in a threaded hole defined in the compression nut, and wherein moving the compression nut in the first direction via rotation of the threaded fastener increases coaxial alignment between the threaded hole and the elongated slot.

18. The compression assembly of claim 14, wherein the surge clamp includes an elongated base with two sidewalls projecting generally orthogonally therefrom, and wherein the compression nut slides between and is guided by the sidewalls of the surge clamp when the compression nut moves in the first direction.

19. The compression assembly of claim 14, further comprising a second surge clamp configured to engage the other of the stack top or the stack bottom to thereby sandwich the stack of busbars between the surge clamps.

20. An electrical busway assembly for distributing electricity from a power utility to a load, the busway assembly comprising:
a stack of busbars with a stack top and a stack bottom, the stack of busbars including a plurality of elongated, individually insulated, electrically conductive busbars stacked one on top of the other, both the stack top and stack bottom being oriented generally perpendicular to the direction of stacking;
first and second duct sides each disposed on a respective side of the stack of busbars and oriented generally parallel to the stack of busbars;
a duct top abutting the stack top;
a duct bottom abutting the stack bottom;
a surge clamp abutting one of the duct top and the duct bottom on a side opposite of the stack of busbars;
a first bolt passing through the first duct side and the surge clamp to thereby attach the surge clamp to the first duct side;
a second bolt passing through the second duct side and the surge clamp to thereby attach the surge clamp to the second duct side;
a first compression nut threadably engaging the first bolt; and
a second compression nut threadably engaging the second bolt,
wherein rotation of the first bolt draws the first compression nut in a first direction towards the first bolt, and rotation of the second bolt draws the second compression nut in a second direction towards the second bolt, and
wherein the first and second compression nuts, when drawn by the first and second bolts, respectively, cooperatively urge the surge clamp in a third direction different from the first and second directions, the surge clamp, when moved in the third direction, applying a compressive force to the stack of busbars.

* * * * *